(12) United States Patent
Puck

(10) Patent No.: US 12,358,007 B1
(45) Date of Patent: Jul. 15, 2025

(54) PORTABLE SPRAYER WITH HOSE NOZZLE

(71) Applicant: Herschel Ah Puck, Lihue, HI (US)

(72) Inventor: Herschel Ah Puck, Lihue, HI (US)

( * ) Notice: Subject to any disclaimer, the term of this patent is extended or adjusted under 35 U.S.C. 154(b) by 322 days.

(21) Appl. No.: 18/139,416

(22) Filed: Apr. 26, 2023

Related U.S. Application Data

(60) Provisional application No. 63/338,469, filed on May 5, 2022.

(51) Int. Cl.
*F16L 3/16* (2006.01)
*B05B 9/08* (2006.01)
*B05B 12/00* (2018.01)
*B05B 15/63* (2018.01)

(52) U.S. Cl.
CPC .......... *B05B 9/0822* (2013.01); *B05B 12/002* (2013.01); *B05B 15/63* (2018.02)

(58) Field of Classification Search
CPC ...... B05B 9/0822; B05B 12/002; B05B 15/63
See application file for complete search history.

(56) References Cited

U.S. PATENT DOCUMENTS

| 3,002,698 A | 10/1961 | Gallo | |
|---|---|---|---|
| 3,650,551 A * | 3/1972 | Akers | F16L 3/16 285/200 |
| 4,457,544 A * | 7/1984 | Snow | F16L 33/30 285/391 |
| 4,944,460 A | 7/1990 | Steingass | |
| 5,221,026 A * | 6/1993 | Williams | B05B 7/24 222/401 |
| 5,772,075 A * | 6/1998 | Ash, Jr. | B67D 1/04 222/399 |
| 5,775,591 A | 7/1998 | Fauci | |
| 6,145,711 A | 11/2000 | Prosper et al. | |
| 6,997,399 B2 | 2/2006 | Lacy | |
| 7,861,949 B1 | 1/2011 | Rodriguez | |
| 2002/0023974 A1* | 2/2002 | Odessa | B05B 9/0816 239/338 |
| 2004/0069817 A1* | 4/2004 | Jacques | A01M 7/0046 222/529 |

(Continued)

FOREIGN PATENT DOCUMENTS

| WO | 2003086946 A3 | 10/2003 |
|---|---|---|
| WO | 2018077486 A1 | 5/2018 |
| WO | 2018201207 A1 | 11/2018 |

*Primary Examiner* — Bob Zadeh
(74) *Attorney, Agent, or Firm* — John Rizvi; John Rizvi, P.A.—The Patent Professor®

(57) ABSTRACT

A portable sprayer and a sprayer assembly for use with a conventional, pressurizable spray tank are provided. The sprayer assembly includes a custom tank fitting, a length of hose and a custom spray nozzle. The custom tank fitting includes a threaded portion, a nut shaped central portion and an elongated barbed portion extending from the nut shape central portion. One end of the hose is attached to the elongated barbed portion of the custom tank fitting and an opposite end of the hose is attached to the custom spray nozzle. The threaded portion of the custom tank fitting is engageable with corresponding threads in a pressure tank and, preferably, includes ten threads pre inch. The custom spray nozzle includes a sprayer housing that is at least partially transparent.

16 Claims, 7 Drawing Sheets

(56) References Cited

U.S. PATENT DOCUMENTS

| | | | |
|---|---|---|---|
| 2005/0121075 A1* | 6/2005 | Riviezzo | B63B 25/082 |
| | | | 137/202 |
| 2006/0102245 A1 | 5/2006 | Kaechle | |
| 2008/0073908 A1* | 3/2008 | Hillhouse | F16L 33/225 |
| | | | 285/242 |
| 2010/0276026 A1* | 11/2010 | Powell | F16L 39/005 |
| | | | 29/428 |
| 2015/0097058 A1* | 4/2015 | Stine | B05B 9/0805 |
| | | | 239/373 |
| 2017/0252762 A1* | 9/2017 | Derman | B05B 9/0811 |
| 2019/0193098 A1* | 6/2019 | Harbaugh | B05B 9/0822 |

* cited by examiner

PORTABLE SPRAYER WITH HOSE NOZZLE

CROSS-REFERENCE TO RELATED APPLICATIONS

This application claims the benefit of U.S. Provisional Patent Application Ser. No. 63/338,469 filed on May 5, 2022, which is incorporated by reference herein in its entirety.

FIELD OF THE INVENTION

The present invention relates generally to portable sprayers, and more particularly, to a portable sprayer having a spray assembly utilizing a high flow rate garden hose.

BACKGROUND OF THE INVENTION

Portable sprayers are used to easily transport and spray various liquid treatments onto a variety of surfaces and substances. For example, a conventional portable sprayer may include insecticides, pesticides, weed and/or grass killers, cleaning agents, etc. These conventional portable sprayers typically include a small tank having a pressurizing system for pressurizing the contents of the tank and a length of small diameter tubing terminating in a trigger actuated spray wand.

The lengths of the supplied tubing tend to be relatively short requiring the operator to carry or move the spray tank close to the surface or substance to be sprayed. Additionally, the small diameter of the tubing supplied in the conventional sprayer restricts the flow of fluid flowing to the spray wand resulting in a relatively small spray pattern.

The spray wands themselves have only limited adjustment to alter the spray pattern. This can become a problem where certain areas require a wide or flat spray pattern while other areas require a narrower or more direct spray pattern. Additionally, the typical spray wands are prone to clogging and it is difficult to determine where in the wand the clogging is occurring.

Accordingly, there is need for a solution to at least one of the aforementioned problems. For instance, there is an established need for a sprayer assembly having a larger diameter flow rate hose and a connector to connect the larger diameter hose to a conventional pressurized spray tank. There is a further established need for a transparent spray nozzle for use with the sprayer assembly such that the flow or lack of flow of fluid through the spray nozzle is easily visible to detect clogs.

SUMMARY OF THE INVENTION

The present invention is directed to a portable sprayer and a sprayer assembly for use with a conventional, pressurizable spray tank. The sprayer assembly includes a custom tank fitting, a length of hose and a custom spray nozzle. The custom tank fitting includes a threaded portion, a nut shaped central portion and an elongated barbed portion extending from the nut shape central portion. One end of the hose is attached to the elongated barbed portion of the custom tank fitting and an opposite end of the hose is attached to the custom spray nozzle. The threaded portion of the custom tank fitting includes ten threads pre inch. The custom spray nozzle includes a sprayer housing that is at least partially transparent.

In a first implementation of the invention, a portable sprayer is provided comprising: a hollow pressure tank having a tank body fitting, said tank body fitting having an internal thread;
 a custom tank fitting defining a through bore and including a threaded portion, a nut shaped central portion adjacent said threaded portion and an elongated barbed portion extending from said nut shaped central portion;
 a length of hollow hose connected to said elongated barbed portion of said custom tank fitting;
 a spray nozzle; and
 a nozzle fitting connected to said length of hollow hose and said spray nozzle, wherein said threaded portion of said custom tank fitting is in engagement with said internal thread of said tank body.

In a second implementation of the invention, a sprayer assembly is provided for use with a pressure tank having a tank body fitting, the sprayer assembly comprising:
 a custom tank fitting defining a through bore and including a threaded portion, a nut shaped central portion adjacent said threaded portion and an elongated barbed portion extending from said nut shaped central portion;
 a length of hollow hose connected to said elongated barbed portion of said custom tank fitting;
 a spray nozzle; and
 a nozzle fitting connected to said length of hollow hose and said spray nozzle, wherein said threaded portion of said custom tank fitting is engageable with an internal thread of a tank body fitting in a pressure tank.

In a second aspect, the threaded portion of the custom tank fitting includes ten threads per inch.

In another aspect, the threaded portion of the custom tank fitting is eleven sixteenths of an inch in diameter.

In another aspect, the custom tank fitting further includes a locking ring surrounding the threaded portion and including detents engageable with a fitting on a pressure tank.

In another aspect, the custom tank fitting further includes an O-ring surrounding the threaded portion and positioned adjacent to the locking ring.

In another aspect, the custom tank fitting is formed from a metallic material.

In another aspect, the custom tank fitting is formed from brass.

In another aspect, the spray nozzle includes a hand grip, a sprayer housing attached to the hand grip and a trigger lever attached to the sprayer housing, wherein at least a portion of the sprayer housing is transparent.

In another aspect, the spray nozzle further includes an adjustable spray head, the adjustable spray head being adjustable to vary a spray pattern of the spray nozzle.

In another aspect, the elongated barbed portion of the custom tank fitting is secured within the hose by a hose clamp.

In a third implementation of the invention, a portable sprayer is provided comprising: a hollow pressure tank having a tank body fitting; a custom tank fitting defining a through bore and including a threaded portion, a nut shaped central portion adjacent the threaded portion and an elongated barbed portion extending from the nut shaped central portion; a custom spray nozzle; and a nozzle fitting; and a length of hollow hose, the length of hollow hose comprises a first end a second end, wherein the first end of the hollow hose is removably connected to the hollow pressure tank with the custom tank fitting, and wherein the custom spray nozzle is connected with the nozzle fitting to the second end of the length of hollow hose.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a portable sprayer with garden hose and spray nozzle that allows a user to substitute a common garden hose and customized spray nozzle for a traditional spray wand.

Figure 1:
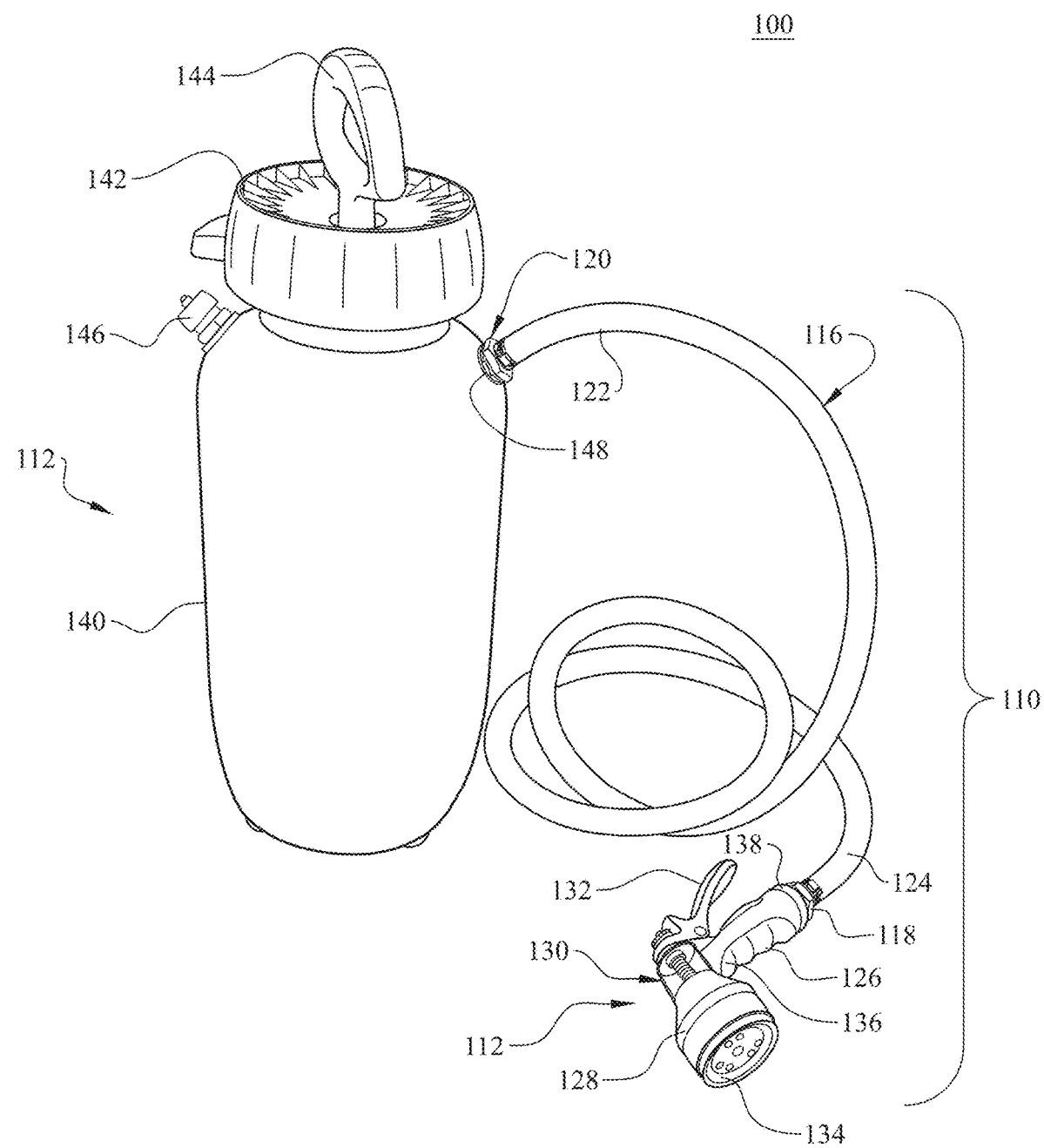
FIG. 1 presents an isometric view of a portable sprayer and garden hose with custom spray nozzle in accordance with a first illustrative embodiment of the present invention.

Referring initially to FIG. 1, a portable sprayer with garden hose and spray nozzle, hereinafter portable sprayer 100, is illustrated in accordance with an exemplary embodiment of the present invention. As shown, the portable sprayer 100 generally includes a removable sprayer assembly 110, having a custom spray nozzle 112, for use with a pressurized fluid reservoir or pressure tank 114. The sprayer assembly 110 further includes an elongate hose 116, a nozzle fitting 118 and a custom tank fitting with locking mechanism, hereinafter custom tank fitting 120, for use with the pressure tank 114.

The sprayer assembly 110 replaces a common tube and spray wand (not shown) and allows a common higher flow rate and longer length section of garden hose for example, hose 116, to be used with the pressure tank 114. A first end 122 of the hose 116 is removably connected to the pressure tank 114 with the custom tank fitting 120 while the spray nozzle 112 is connected to a second end 124 of the hose 116 with the nozzle fitting 118.

The spray nozzle 112 includes an elongated hand grip 126 and a sprayer housing 128 affixed to the hand grip 126. The sprayer housing 128 has a transparent portion 130 that allows a user to view the mechanics and fluid level within the sprayer housing 128 as described in more detail hereinbelow. A trigger lever 132 is pivotally attached to the sprayer housing 128 and is provided to control the flow of fluid through the sprayer housing 128. The spray nozzle 112 further includes an adjustable spray head 134 to vary the pattern of the spray of fluid emanating from the spray nozzle 112. An upper end 136 of the hand grip 126 is affixed to the sprayer housing 128 while a lower end 138 of the hand grip 126 is affixed to the nozzle fitting 118.

The pressure tank 114 is a common, pressurizable tank of the type typically provided with a commercially available spray wand and tube or may be specifically configured for use with the disclose sprayer assembly 110. The pressure tank 114 generally includes a hollow tank body 140 having a removable cap 142. A pump handle 144 is movably mounted to and extends through the removable cap 142. Movement of the pump handle 144 relative to the tank body 140 pressurizes any fluid contained within the tank body 140. An over pressure relief valve 146 is fitted to the tank body 140 to prevent over pressurizing the pressure tank 114. Alternatively, the over pressure relief valve 146 may be provided in the removable cap 142. The pressure tank 114 additionally includes a tank body fitting 148 for attachment of the sprayer assembly 110.

Figure 2:
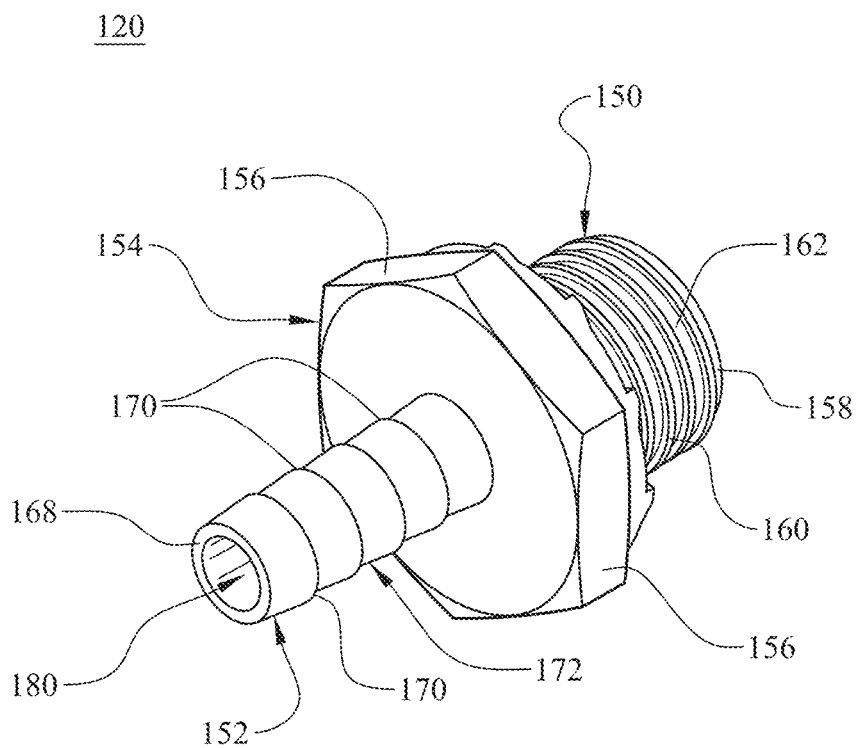
FIG. 2 presents an isometric view of a custom sprayer tank to garden hose fitting with locking device for use with the portable sprayer and garden hose with custom spray nozzle illustrated in FIG. 1.
Figure 3:
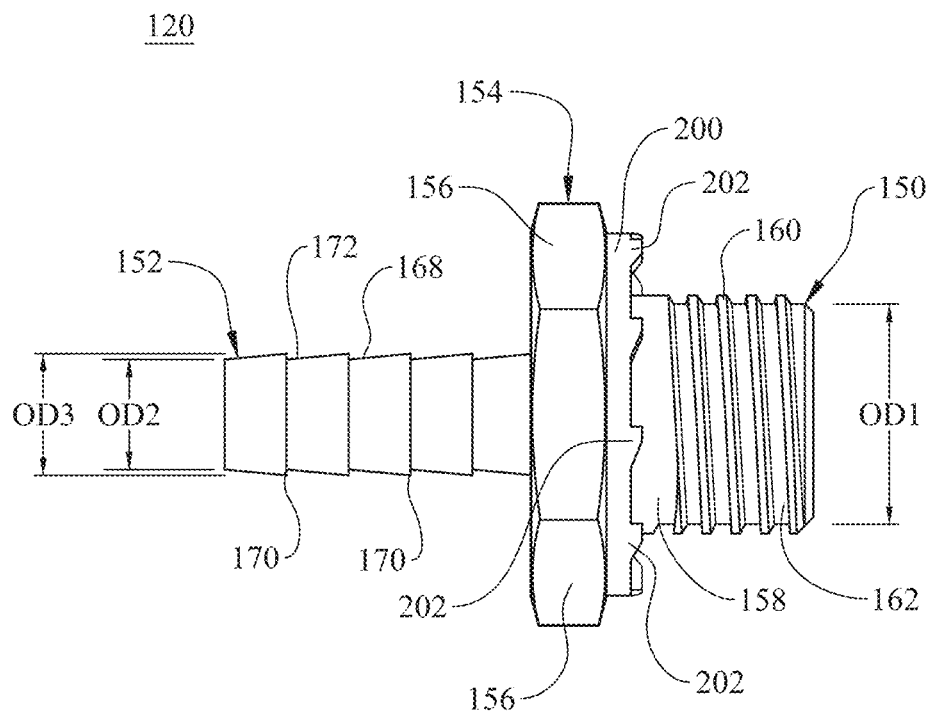
FIG. 3 presents a side plan view of the custom sprayer tank to garden hose fitting with locking device illustrated in FIG. 2.

Turning now to FIGS. 2-5, and initially with regard to FIGS. 2 and 3, the custom tank fitting 120 is provided to attach a common garden type hose, such as, for example hose 116, to the tank body 140 of the pressure tank 114. The custom tank fitting 120 generally includes a hollow threaded rear portion 150, a hollow elongated barbed forward portion 152, and a hollow, nut shaped center portion 154. The nut shaped center portion 154 has a plurality of flat facets 156. The flat facets 156 of the center portion 154 of the custom tank fitting 120 are provided to be grasped by a wrench in order to rotate and tighten the custom tank fitting 120 into the body tank fitting 148 (see FIGS. 1 and 6) of the pressure tank 114.

The threaded rear portion 150 of the custom tank fitting 120 is specially designed to allow the custom tank fitting 120 to be connected to the body tank fitting 148 of the pressure tank 114. The threaded rear portion 150 includes a cylindrical body portion 158 having an external thread 160 formed around an outer surface 162 of the cylindrical body portion 158. The cylindrical body portion 158 has an outer diameter ("OD1") of $^{11}/_{16}$ths of an inch (FIG. 3) and the external thread 160 has a thread pitch of 10 threads per inch ("TPn"). This OD1 and TPI mates perfectly with corresponding opening and internal thread sizes provided in the body fitting 148 of the pressure tank 114.

The elongated barbed forward portion 152 of the custom tank fitting 120 is provided to be inserted into a hose or tube such as, for example, hose 116. The elongated barbed forward portion 152 includes a cylindrical body portion 168 having a plurality of outwardly directed circumferential barbs 170 provided on an outer surface 172 of the cylindrical body portion 168. The circumferential barbs 170 are provided to engage an inner surface of hose 116 and seal the custom tank fitting 120 within the hose 116 in a manner described in more detail hereinbelow. In a specific embodiment, the cylindrical body portion 168 has an outer diameter ("OD2") of 0.375 inches and the circumferential barbs 170 have an outer diameter ("OD3") of 0.413 inches (FIG. 3).

Figure 4:
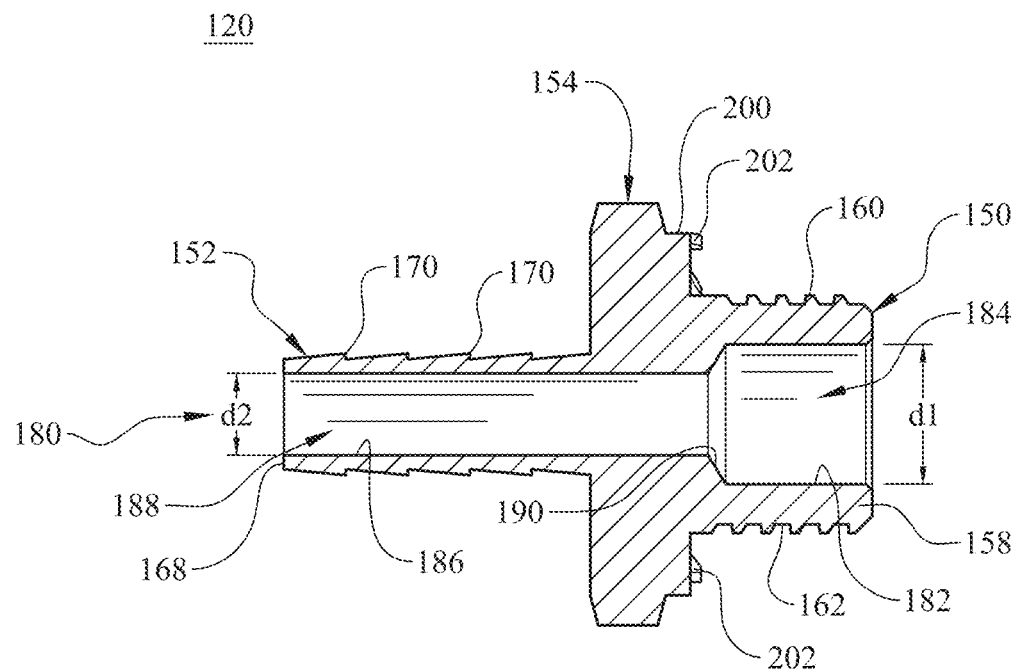
FIG. 4 presents a side view, shown in section, of the custom sprayer tank to garden hose fitting with locking device illustrated in FIG. 3.

As best shown in FIG. 4, the custom tank fitting 120 defines a through bore 180 for passage of fluid from the pressure tank 114 to the hose 116. More specifically, an inner surface 182 of the cylindrical body portion 158 of the threaded rear portion 150 of the custom tank fitting 120 defines an internal cavity or first channel 184 having an inner diameter "d1". Preferably, the inner diameter "d1" of the cylindrical body portion 158 is approximately 0.480 of an inch. Likewise, an inner surface 186 of the cylindrical body portion 168 of elongated barbed forward portion 152 of the custom tank fitting 120 defines a second channel 188 coaxial with the first channel 184. The second channel 188 preferably has an inner diameter "d2" of approximately 0.281 inches. Where the inner diameter "d1" of the first channel 184 differs from the inner diameter "d2" of the second channel 188, the through bore 180 includes a transition zone 190 tapering between the first and second channels 184 and 188, respectively.

Figure 5:
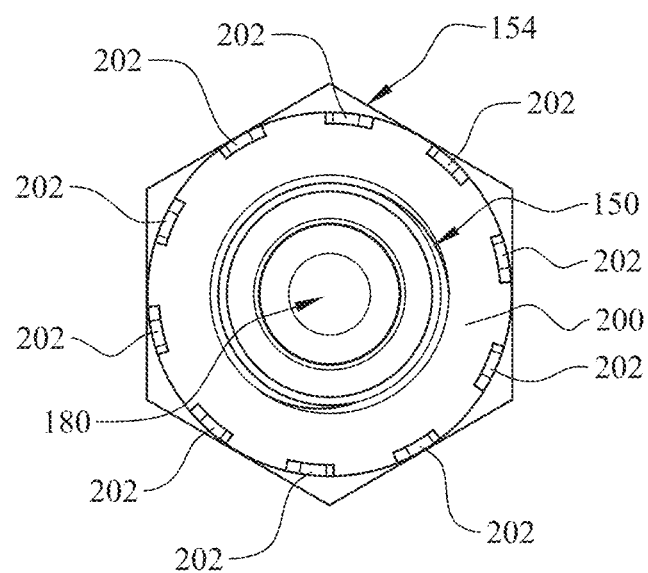
FIG. 5 presents an end view of the custom sprayer tank to garden hose fitting with locking device illustrated in FIG. 3.

Referring for the moment to FIGS. 3-5, the custom tank fitting 120 is provided with a locking ring 200 to hold the custom tank fitting 120 securely in position after it has been threaded into the tank body fitting 148 of the pressure tank 114. The locking ring 200 is provided with a series of outwardly facing detents 202 to engage the tank body fitting 148.

The custom tank fitting 120 can be formed from a variety of materials such as, for example, polymeric or plastic materials, metallic materials, such as, for example, stainless steel, aluminum, bronze, etc. In a preferred embodiment, the custom tank fitting 120 is formed from brass.

The custom tank fitting 120 can be formed from separate components and joined together with known methods such as, for example, gluing, welding, etc. For example, the threaded rear portion 150, the elongated barbed forward portion 152 and the nut shaped center portion 154 may be formed separately and subsequently joined together. As best shown in FIG. 4, in a preferred embodiment, the custom tank fitting 120 is formed as an integral unit.

Figure 6:
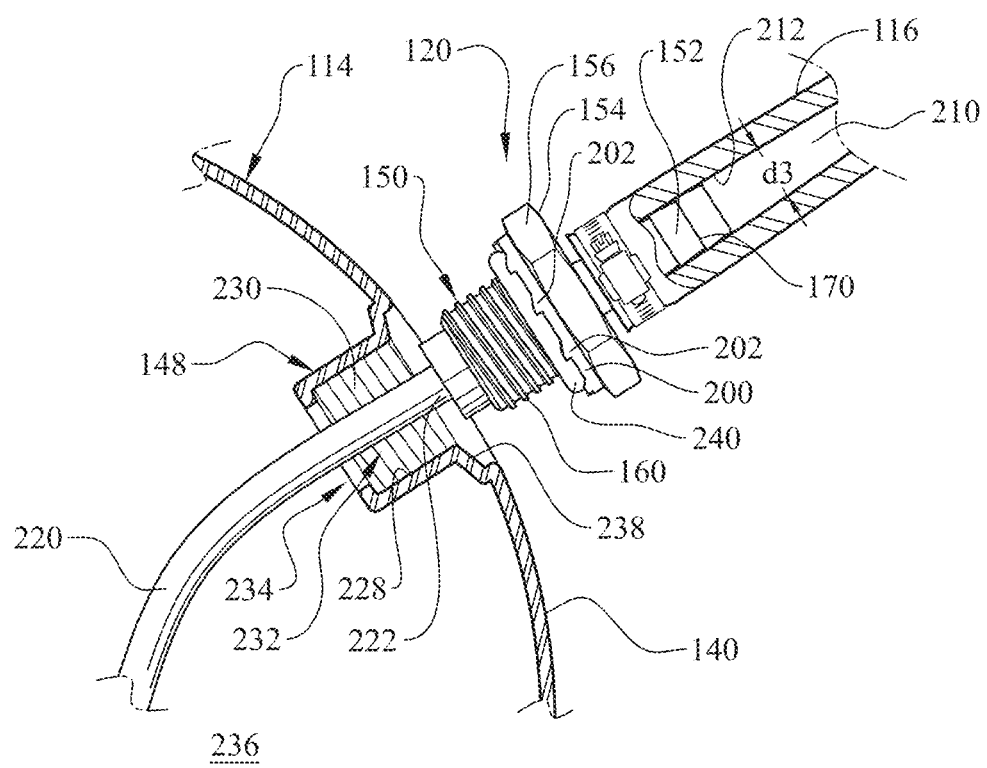
FIG. 6 presents a side plan view, partially shown in section, of the custom sprayer tank to garden hose fitting with locking device affixed to a garden hose of the portable sprayer and garden hose with custom spray nozzle and immediately prior to being attached to a sprayer tank of the portable sprayer and garden hose with custom spray nozzle.

Turning now to FIG. 6, the use of the custom tank fitting 120 to join the hose 116 to the pressure tank 114 will now be described. The hose 116 is a section of common garden hose having an inner channel or bore 210 defined by an inner surface 212 of the hose 116. The bore 210 has a diameter 'd3" slightly larger than the diameter OD3 (FIG. 3) of the circumferential barbs 170 of the forward portion 152 of the custom tank fitting 120. To attach the custom tank fitting 120 to the hose 116, the forward portion 152 of the custom tank fitting 120 is inserted into the bore 210 of the hose 116 at the first end 122 (FIG. 1) of the hose 116. The forward portion 152 is forced into the bore 210 such that the barbs 170 engage the inner surface 212 of the hose 116 to seal the forward portion 152 of the custom tank fitting 120 within the hose 116. In order to secure the custom tank fitting 120 to the hose 116, a conventional hose clamp 214 may be positioned over the hose 116 where the hose 116 covers the forward portion 152 of the custom tank fitting 120 and cinched down to secure the inner surface 212 of the hose 116 over the barbs 170 of the custom tank fitting 120.

In order to draw fluids out of the hollow tank body 140 of the pressure tank 114, the pressure tank 140 is typically provided with a pickup tube 220 which carries the fluid from the hollow tank body 140 to the wand or sprayer provided with the pressure tank 114. The pickup tube 220 is connected to the custom tank fitting 120 by inserting an end 222 of the pickup tube 220 into the first channel 184 (FIG. 4) in the threaded rear portion 150 of the custom tank fitting 120. The pickup tube 220 can be secured within the custom tank fitting 120 by gluing or may be secured therein in friction fit fashion.

As noted hereinabove, the hollow tank body 140 is provided with the tank body fitting 148. The tank body fitting 148 includes an inner surface 228 having threads 230 which cooperate with the external thread 160 on the custom tank fitting 120. The tank body fitting 148 defines a chamber 232 having an opening 234 in fluid communication with an interior 236 of the hollow tank body 140.

To assembly the custom tank fitting 120 to the pressure tank 114, the pickup tube 220 is inserted through the tank body fitting 148 such that the pickup tube 220 passes through the opening 234 and extends into the interior 236 of the hollow tank body 140. Thereafter, the custom tank fitting 120 is inserted into the chamber 232 of the tank body fitting 148 and rotated to engage the external thread 160 on the custom tank fitting 120 with the threads 230 in the tank body fitting 148. The facets 156 on the nut shaped center portion 154 of the custom tank fitting 120 are provided to allow a person to use a wrench to tighten the custom tank fitting 120 within the tank body fitting 148 of the pressure tank 114.

In order to fully secure the custom tank fitting 120 within the tank body fitting 148 of the pressure tank 114, the custom tank fitting 120 is rotated into the tank body fitting 148 until the locking ring 200 engages an angled edge 238 of the tank body fitting 148. The detents 202 of the locking ring 200 are forced into engagement with the angled edge 238 to secure the custom tank fitting 120 to the pressure tank 114. In order to make the connection more leak proof, an O-ring 240 may be provided around the threaded rear portion 150 of the custom tank fitting 120. The O-ring 240 is located adjacent to the locking ring 200 and is seated within the tank body fitting 140 against the angled edge 238 of the tank body fitting 148 as the custom tank fitting 120 is rotated into the tank body fitting 148. The O-ring 240 may be formed from rubber, polymers or plastics such as, for example, silicones, and the like.

Thus, in this manner, the sprayer assembly 110 (FIG. 1), including the hose 116 and the custom tank fitting 120, is securely attached to the pressure tank 114. The custom spray nozzle 112 of the sprayer assembly 110 may be attached to the hose 116 before or after attaching the hose 116 and the custom tank fitting 120 to the pressure tank 114.

Figure 7:
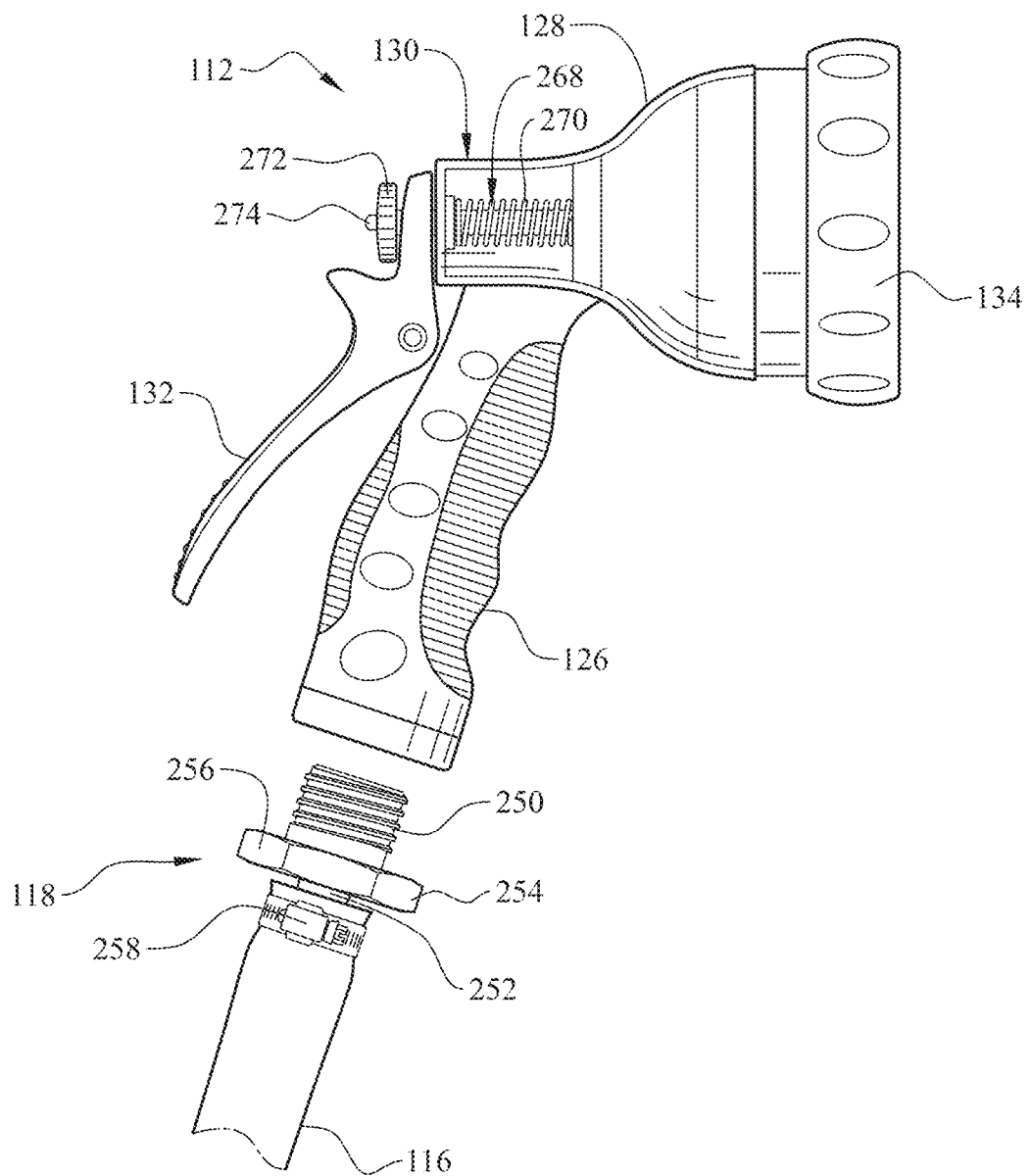
FIG. 7 presents a side plan view of a custom spray nozzle with transparent housing of the portable sprayer and garden hose with custom spray nozzle and an opposite end of the garden hose.

Turning now to FIG. 7, and as noted hereinabove, the sprayer assembly 110 includes a nozzle fitting 118 to connect the custom spray nozzle 112 to the hose 116. The nozzle fitting 118 is similar to the custom tank fitting 120 and generally includes a threaded portion 250, an elongated barbed portion 252 and a nut shaped center portion 254. The nozzle fitting 118 is assembled to the hose 116 by inserting the elongated barbed portion 252 into the second end 124 of the hose 116 (FIG. 1) and securing it therein with a second hose clamp 258.

The custom spray nozzle 112 is connected to the nozzle fitting 118 by rotating the custom spray nozzle 112 onto the threaded portion 250 of the nozzle fitting 118. Specifically, the threaded portion 250 of the nozzle fitting 118 is rotated into a threaded interior (not shown) in the hand grip 126 of the custom spray nozzle 112.

As noted hereinabove, the sprayer housing 128 of the custom spray nozzle 112 includes a transparent portion 130 to view the internal mechanism of the custom spray nozzle 112 as well as the fluid level within the sprayer housing 128. Alternatively, the entire sprayer housing 128 may be transparent.

The custom spray nozzle 112 includes an actuating shaft 268 extending through the sprayer housing 128 and connected to the trigger lever 132. Depression of the trigger lever 132 relative to the sprayer housing 128 moves the actuating shaft 268 within the sprayer housing 128 to open a port (not shown) adjacent to the adjustable spray head 134 to allow pressurized fluid to flow through the sprayer housing 128 and out the adjustable spray head 134. The adjustable spray head 134 can be rotated relative to the sprayer housing 128 to vary the spray pattern of the custom spray nozzle 112.

A coil spring 270 is provided within the sprayer housing 128 and about the actuating shaft 268 to bias the trigger lever 132 to a closed or off position. An adjustment nut 272 it threadably positioned over a threaded end 274 of the actuating shaft 268 to adjustably secure the actuating shaft 268 in a partially open or on condition. By rotating the adjustment nut 272 about the actuating shaft 268 the degree of "openness" of the custom spray nozzle can be adjusted.

In operation, the cap 142 of the pressure tank 114 is removed and the desired fluid (not shown) poured into the interior 236 of the hollow tank body 140 of the pressure tank 114. Thereafter, the cap 142 is reattached to the hollow tank body 140 and the pump handle 144 operated to pressurize the fluid within the pressure tank 114. The operator can then transport the disclosed portable sprayer 100 to the desired location and the trigger lever 132 of the custom spray nozzle 112 actuated to spray the fluid onto the desired location. The transparent portion 130 of the custom spray nozzle 112 allows the operator to view the flow of fluid through the custom spray nozzle 112.

In this manner, the disclosed sprayer assembly 110 of the portable sprayer 100 provides a novel and useful device for attaching a conventional or custom spray nozzle 112 to a pressure tank 114. The disclosed sprayer assembly 110 further allows a user to substitute a substantial length of conventional garden hose for the smaller diameter and shorter tubing typically provided with a tank type sprayer.

Since many modifications, variations, and changes in detail can be made to the described preferred embodiments of the invention, it is intended that all matters in the foregoing description and shown in the accompanying drawings be interpreted as illustrative and not in a limiting sense.

Thus, the scope of the invention should be determined by the appended claims and their legal equivalents.

What is claimed is:

1. A portable sprayer, comprising:
    a hollow pressure tank having a tank body fitting, the tank body fitting having an internal thread; and
    a removable sprayer assembly, the removable sprayer assembly comprising:
    a custom tank fitting defining a through bore and including a threaded portion, a nut shaped central portion adjacent the threaded portion and an elongated barbed portion extending from the nut shaped central portion, wherein the threaded portion has an outer diameter and an external thread that correspond to opening and the internal thread of the tank body fitting, wherein the custom tank fitting further comprises a locking ring surrounding the threaded portion, the locking ring comprising detents engageable with the tank body fitting;
    a length of hollow hose connected to the elongated barbed portion of the custom tank fitting;
    a custom spray nozzle; and
    a nozzle fitting connected to the length of hollow hose and the custom spray nozzle, wherein the threaded portion of the custom tank fitting is in engagement with the internal thread of the tank body.

2. The portable sprayer of claim 1, wherein the length of hollow hose comprises a first end and a second end, the first end of the length of the hollow hose being connected to the custom tank fitting, and the second end of the length of the hollow hose being connected to the nozzle fitting.

3. The portable sprayer of claim 1, wherein the custom spray nozzle comprises an elongated hand grip and a sprayer housing affixed to the elongated hand grip.

4. The portable sprayer of claim 3, wherein at least a portion of the sprayer housing is transparent.

5. The portable sprayer of claim 3, further comprising a trigger lever pivotally attached to the sprayer housing, and an adjustable spray head, the adjustable spray head being adjustable to vary a spray pattern of the custom spray nozzle.

6. The portable sprayer of claim 1, wherein the nut shaped central portion comprises a plurality of flat facets.

7. The portable sprayer of claim 1, wherein the custom tank fitting further comprises an O-ring surrounding the threaded portion and positioned adjacent to the locking ring.

8. The portable sprayer of claim 1, wherein the elongated barbed portion of the custom tank fitting is secure within the length of hollow hose by a hose clamp.

9. A sprayer assembly for use with a pressure tank having a tank body fitting, the sprayer assembly comprising:
    a custom tank fitting defining a through bore and including a threaded portion, a nut shaped central portion adjacent the threaded portion, and an elongated barbed portion extending from the nut shaped central portion, wherein the threaded portion has an outer diameter and an external thread that correspond to opening and an internal thread of the tank body fitting, and wherein the custom tank fitting further comprises a locking ring surrounding the threaded portion, the locking ring comprising detents engageable with the tank body fitting;
    a length of hollow hose connected to the elongated barbed portion of the custom tank fitting;
    a custom spray nozzle; and
    a nozzle fitting connected to the length of hollow hose and the custom spray nozzle, wherein the threaded portion of the custom tank fitting is engageable with the internal thread of the tank body fitting of the pressure tank.

10. The sprayer assembly of claim 9, wherein the custom spray nozzle comprises an elongated hand grip and a sprayer housing affixed to the elongated hand grip.

11. The sprayer assembly of claim 10, further comprising a trigger lever pivotally attached to the sprayer housing, and an adjustable spray head, the adjustable spray head being adjustable to vary a spray pattern of the custom spray nozzle.

12. The sprayer assembly of claim 9, wherein the nut shaped central portion comprises a plurality of flat facets.

13. The sprayer assembly of claim 9, wherein the threaded portion of the custom tank fitting comprises ten threads per inch.

14. The sprayer assembly of claim 9, wherein the threaded portion of the custom tank fitting is eleven sixteenths of an inch in diameter.

15. The sprayer assembly of claim 9, wherein the custom tank fitting further comprises an O-ring surrounding the threaded portion and positioned adjacent to the locking ring.

16. The sprayer assembly of claim 9, wherein the length of hollow hose comprises a first end and a second end, the first end of the length of the hollow hose being connected to the custom tank fitting, and the second end of the length of the hollow hose being connected to the nozzle fitting.

\* \* \* \* \*